United States Patent Office 3,126,400
Patented Mar. 24, 1964

3,126,400
ORGANIC TIN COMPOUNDS CONTAINING SULPHUR
Charles Robert Cramer, Vaduz, Liechtenstein, and Willem F. L. de Bruijn, Buchs, Switzerland
No Drawing. Filed Nov. 30, 1959, Ser. No. 855,990
Claims priority, application Switzerland Dec. 2, 1958
1 Claim. (Cl. 260—429.7)

The invention relates to a process for the production of organic tin compounds containing sulfur and, more particularly, containing sulfur in the form of reactive thioesters.

It is known that organic tin compounds, e.g., derivatives of alkyl- and aryl tin oxides, are employed as heat and light stabilizers for high-molecular compounds containing chlorine, such as polyvinyl chloride. As stabilizers most such sulfur-containing organic tin compounds are proposed which have the following configuration (1):

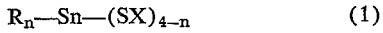

$$R_n—Sn—(SX)_{4-n} \qquad (1)$$

wherein X may be one of the following:
a. An ester radical of a monovalent carboxylic acid;
b. An ester radical of a bivalent carboxylic acid;
d. A glycerol radical;
e. A carboxylic acid amide radical;
f. A xanthogenate radical.

The sulfur in those compounds is bound directly to the tin. Other suggested sulfur-containing organic tin compounds are thiomalates of dialkyl tin and trialkyl tin whose thiol group is either free or acylated.

It furthermore is known that many organic tin compounds, beside their stabilizing effects, also can be used as fungicides, biocides and as catalysts.

The object of the invention is to devise a process for the production of sulfur-containing organic tin compounds, wherein the sulfur atoms form a thioester group with a carboxyl group of a dicarboxylic acid whose other carboxyl group is linked to tin, and which simultaneously are bound to a carboxylic or dicarboxylic acid radical. The process according to the invention consists of the reaction of dicarboxylic acids or their functional derivatives with a sulfur-containing carboxylic acid ester which forms thioesters and further reaction of the product thus obtained with organic tin oxides, hydroxides or halides.

The sulfur-containing organic tin compounds produced according to the invention have the following general structure (2) or (3):

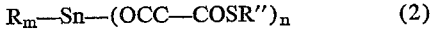

$$R_m—Sn—(OCC—COSR'')_n \qquad (2)$$

or

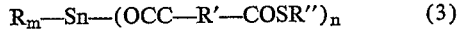
$$R_m—Sn—(OCC—R'—COSR'')_n \qquad (3)$$

wherein
R is an alkyl-, alkenyl-, cycloalkyl-, aryl- or a heterocyclic radical;
R' is an aliphatic, alicyclic or aromatic bivalent hydrocarbon radical;
R" is an aliphatic, alicyclic, aromatic or heterocyclic monocarboxylic or dicarboxylic acid ester radical;
m and n are whole numbers from 1–3 whose total is 4.

In order to produce the organic tin compounds by the process according to the invention, dicarboxylic acids or their ester-forming derivatives, e.g., their anhydrides, salts or acid halides, are esterified with mercapto carboxylic acid esters, with mercapto dicarboxylic acid esters or with their alkali derivatives, in the usual manner. Thus, e.g., a dicarboxylic acid anyhydride can be reacted with thio- or mercapto acid esters. The thiosemiesters thus produced are reacted, in a second step, if necessary in the presence of alkalies, with organic tin oxides, hydroxides or halides. By this process, the following compounds can be reacted with each other; among many others:

(1) Maleic anhydride with n-dibutyl thiomalate, and the reaction product formed with di-n-octyl tin oxide, according to Example 1.

(2) Maleic anhydride with n-butyl thiopropionate, and the reaction product formed with di-n-butyl tin oxide, according to Example 6.

(3) Maleic anhydride with n-octyl thioglycolate, and the reaction product formed with dibutyl tin oxide, according to Example 1.

(4) Succinic anhydride with n-diethyl thiomalate, and the reaction product formed with bis-tributyl tin oxide, according to Example 1.

(5) Phthalic anhydride with ni-dimethyl thiomalate, and the reaction product formed with bis-tributyl tin oxide, according to Example 1.

(6) Glutaric anhydride with n-dibutyl thiomalate, and the reaction product formed with dioctyl tin oxide, according to Example 2.

(7) Citraconic anhydride with n-dibutyl thiomalate, and the reaction product formed with dibutyl tin oxide, according to Example 1.

(8) Glutaconic anhydride with n-lauryl thioglycolate, and the reaction product formed with dibutyl tin oxide, according to Example 3.

(9) Itaconic anhydride with n-allyl thiopropionate, and the reaction product formed with bis-tributyl tin chloride, according to Example 7.

(10) Maleic acid chloride with sodium-n-dibutyl thiomalate, and the reaction product formed with dibutyl tin oxide, according to Example 8.

(11) Fumaric acid chloride with sodium-n-butyl thiopropionate, and the reaction product formed with dioctyl tin oxide, according to Example 8.

(12) Adipic acid chloride with sodium-n-dibutyl thiomalate, and the reaction product formed with bis-tributyl tin oxide, according to Example 8.

(13) Terephthalic acid chloride with sodium-n-butylthiopropionate, and the reaction product formed with bis-tributyl tin oxide, according to Example 8.

(14) Isophthalic acid chloride with sodium-n-butyl thioglycolate, and the reaction product formed with dibutyl tin oxide, according to Example 8.

The invention now will be further illustrated by means of the following examples. However, it should be understood that these are given merely by way of explanation, not of limitation, and that numerous changes may be made in the details without departing from the spirit and scope of the invention as hereinafter claimed.

*Example 1*

262 g. (1 mol) n-butyl ester of thiomalic acid are refluxed for 1 hour with 108 g. (approximately 1.1 mol) maleic anhydride in 500 ml. toluene. After cooling, the reaction mixture is washed in a separating funnel three times with 100 ml. water each. It then is dried over sodium sulfate. After distilling the toluene, 281 g. (78 percent of theory) of the semiester of maleic acid with thiomalic-n-butyl ester are obtained. 2 mols of this product are esterified with 1 mol dibutyl tin oxide. For the esterification, toluene is added and distilled for the azeotropic removal of the water of reaction. After complete removal of the toluene, the reaction product is filtered through kieselguhr. The yield is 334 g. disubstituted dibutyl tin maleinate in form of a yellow oil. The reaction described above proceeds according to the following formula:

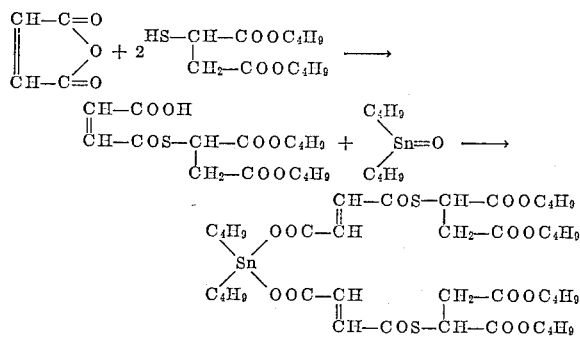

Example 2

200 g. of the semiester of Example 1 are reacted in the same manner as in Example 1, but with ½ mol dioctyl tin oxide. The yield, after removal of the toluene, is 284 g. (92 percent of theory) of a yellow liquid.

Example 3

98 g. (1 mol) maleic anhydride and 224 g. (1.1 mol) thioglycolic acid-n-octyl ester are reacted in 500 ml. toluene as described in Example 1. After removal of the toluene, the yield of semiester is 245 g., or 81 percent of theory. This semiester then is reacted with ½ mol dibutyl tin oxide. After removal of the toluene, 332 g. (98 percent of theory) of a yellow oil are obtained.

Example 4

200 g. of the semiester of Example 1 are reacted with ½ mol bis-tributyl tin oxide, as described in Example 1. After removal of the toluene, the yield is 478 g. (99 percent of theory) of a yellow oil.

Example 5

98 g. (1 mol) maleic anhydride and 411 g. (approximately 1.1 mols) diisooctyl thiomalate are reacted in 500 ml. toluene in the manner described in Example 1. After removal of the toluene 382 g. (81 percent of theory) semiester are obtained. This is reacted with ½ mol dibutyl tin oxide in the usual manner. The yield after removal of the toluene is 452 g. (90 percent of theory) of a yellow liquid.

Example 6

148 g. (1 mol) phthalic anhydride and 163 g. (approximately 1.1 mols) thioglycolic acid-n-butyl ester are reacted in 500 ml. toluene in the manner described in Example 1. After removal of the toluene, 210 g. (71 percent of theory) semiester are obtained. This is dissolved in 500 ml. toluene and, together with ½ mol dibutyl tin dichloride, refluxed for 1 hour. For the removal of hydrochloric acid formed, nitrogen is blown through the reaction product. After filtering off the impurities and distilling the toluene, the yield is 390 g. (92 percent of theory) of a highly viscous mass.

Example 7

98 g. (1 mol) maleic anhydride and 178 g. (approximately 1.1 mols) thiopropionic acid lauryl ester are reacted in 500 ml. toluene in the manner described in Example 1. The yield of semiester, after removal of the toluene, is 182 g. or 70 percent of theory. The semiester is reacted with ½ mol dibutyl tin dichloride in toluene. Hydrochloric acid formed during this reaction is removed by the introduction of nitrogen. After termination of the hydrochloric acid formation and removal of the toluene, 236 g. (90 percent of theory) of a yellow liquid are obtained.

Example 8

254 g. (2 mols) oxalyl chloride are dissolved in 500 ml. toluene, and the solution is agitated mechanically. Within 1 hour, 284 g. (1 mol) sodium-n-dibutyl thiomalate are added gradually with continued strong agitation. After the addition, reflux is maintained for another 10 minutes, and thereafter the excess oxalyl chloride distilled as completely as possible. The residue is filtered from the separated sodium chloride and is washed twice with 200 ml. water each whereby the excess acid chloride still present is decomposed. The mixture then is dried over sodium sulfate, and the toluene distilled. 279 g. (79 percent of theory) semiester of oxalic acid with thiomalic acid-n-butyl ester thus are obtained. 250 g. (0.7 mol) thereof are added to 208 g. (0.35 mol) bis-tributyl tin oxide. For the esterification, toluene is added and distilled for the azeotropic removal of water. After removal of the toluene, the reaction mixture is filtered through kieselguhr. 427 g. (97 percent of theory) tributyl tin oxalyl-di-n-butyl thiomalate in form of a yellow oil are thus obtained.

We claim as our invention:

Heat- and light stabilizers for chlorine-containing high-molecular compounds, consisting of compounds having a structure selected from the group consisting of

and

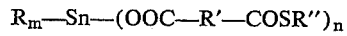

wherein R is a radical selected from the group consisting of alkyl radicals having 4 and 8 carbon atoms; R' is selected from the group consisting of an aliphatic hydrocarbon of 2 to 4 carbon atoms and phenylene; and SR" is selected from the group consisting of thioglycolic-, thiopropionic- and thiomalic acid alkyl and allyl ester radicals; and $m$ and $n$ are whole numbers from 1 to 3 whose total is 4.

References Cited in the file of this patent

UNITED STATES PATENTS

| | | |
|---|---|---|
| 2,560,034 | Eberly | July 10, 1951 |
| 2,838,554 | Gloskey | June 10, 1958 |
| 2,857,413 | Weinberg | Oct. 21, 1958 |
| 2,910,452 | Crauland | Oct. 27, 1959 |
| 2,977,379 | Dorfelt et al. | Mar. 28, 1961 |
| 3,016,369 | Montermoso | Jan. 9, 1962 |
| 3,019,247 | Mack et al. | Jan. 30, 1962 |

OTHER REFERENCES

Shriner and Fuson: "Identification of Organic Compounds," 3d Edition, 1949, page 203 relied on.